United States Patent
Law et al.

(10) Patent No.: US 7,269,468 B2
(45) Date of Patent: Sep. 11, 2007

(54) STATE MACHINE FUNCTION BLOCK WITH A USER MODIFIABLE OUTPUT CONFIGURATION DATABASE

(75) Inventors: Gary K. Law, Georgetown, TX (US); Michael G. Ott, Austin, TX (US); Kent A. Burr, Round Rock, TX (US); Godfrey R. Sherriff, Austin, TX (US); Julian Naidoo, Cedar Park, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 489 days.

(21) Appl. No.: 10/655,929

(22) Filed: Sep. 5, 2003

(65) Prior Publication Data

US 2005/0055111 A1    Mar. 10, 2005

(51) Int. Cl.
*G05B 15/00* (2006.01)
(52) U.S. Cl. ............................................. 700/86
(58) Field of Classification Search ............... 700/83
See application file for complete search history.

(56) References Cited

U.S. PATENT DOCUMENTS

| | | | | |
|---|---|---|---|---|
| 5,530,643 | A | * | 6/1996 | Hodorowski ............... 700/86 |
| 5,768,119 | A | | 6/1998 | Havekost et al. |
| 5,838,563 | A | * | 11/1998 | Dove et al. ................. 700/83 |
| 5,845,063 | A | | 12/1998 | Khrapunovich et al. |
| 5,909,368 | A | * | 6/1999 | Nixon et al. ................ 700/2 |
| 6,078,320 | A | | 6/2000 | Dove et al. |
| 6,157,864 | A | * | 12/2000 | Schwenke et al. ......... 700/79 |
| 6,369,836 | B1 | | 4/2002 | Larson et al. |
| 6,442,512 | B1 | | 8/2002 | Sengupta et al. |
| 6,489,971 | B1 | | 12/2002 | Miller et al. |
| 6,526,566 | B1 | * | 2/2003 | Austin ....................... 717/109 |

(Continued)

FOREIGN PATENT DOCUMENTS

GB    2 394 563 A    4/2004

(Continued)

OTHER PUBLICATIONS

"Simplified Safety System Programming," Control Engineering. online, Sep. 1, 2000, 2 pages, available at http://www.manufacturing.net/ctl/index.asp?layout=article&articleid=CA211671, printed on Jun. 3, 2003.

(Continued)

*Primary Examiner*—Thomas K. Pham
(74) *Attorney, Agent, or Firm*—Marshall, Gerstein & Borun LLP

(57) ABSTRACT

A control system, a safety system, etc., within a process plant may each use one or more state machine function blocks that can be easily integrated into a function block diagram programming environment. Such a state machine function block may include one or more inputs, which may or may not cause a state machine implemented by the state machine function block to change states. The state machine function block may also include a plurality of outputs. Output configuration data associated with the function block may indicate values of the outputs of the function block for each of the states of the state machine. The state machine function block may use this output configuration data to determine its outputs when in a particular state.

65 Claims, 10 Drawing Sheets

U.S. PATENT DOCUMENTS

| | | |
|---|---|---|
| 6,665,648 B2 * | 12/2003 | Brodersen et al. ............ 705/7 |
| 6,931,288 B1 | 8/2005 | Lee et al. |
| 6,954,724 B2 | 10/2005 | Kodosky et al. |
| 2002/0194218 A1 | 12/2002 | Klapper et al. |
| 2003/0135533 A1 | 7/2003 | Cook |

FOREIGN PATENT DOCUMENTS

| | | |
|---|---|---|
| GB | 2394563 | 4/2004 |
| WO | WO-00/33235 A1 | 6/2000 |
| WO | WO 03/092044 A2 | 11/2003 |
| WO | WO 03/092044 A3 | 2/2004 |

OTHER PUBLICATIONS

"CEM Programming Language Editor," 2 pages, available at http://www.triconex.com, printed on Jun. 3, 2003.

"IEC 61131-3: a standard programming resource," 8 pages, available at http://www.plcopen.org/intro_iec/intro_iec.htm, printed on May 15, 2003.

"QUADLOG Safety Matrix," Moore Process Automation Solutions, 6 pages, available at http://www.sea.siemens.com/process/docs/piql-16.pdf, Dec. 1998.

"A structured approach to the specification and implementation of Cause & Effect application logic in safety related PLCs," TUV Rheinland, 4th International Symposium, PLCs in Safety Related Applications, Cologne, May 3 to 4, 2000, 18 pages.

"Safety Life Cycle Management with Cause and Effect Matrix Tools," William M. Goble and John A. Cusimano, Dec. 31, 1969, Summary found on the web at http://searchpdf.adobe.com/proxies/1/63/15/8.html, 2 pages.

U.S. Appl. No. 09/707,580 entitled "Integrated Alarm Display in a Process Control Network," which was filed on Nov. 7, 2000.

U.S. Appl. No. 10/401,655 entitled "Function Block Implementation of a Cause and Effect Matrix For Use in a Process Safety System," which was filed on Mar. 28, 2003.

Search Report under Section 17(5) issued in GB0419580.6 application issued by the United Kingdom Patent Office on Jan. 17, 2005.

Search Report Under Section 17(5) issued in GB0419583.0 application by the U.K. Patent Office on Nov. 26, 2004.

* cited by examiner

| OUTPUTS / STATES | 1 - OPEN VALVE 101 | 2 - CLOSE VALVE 101 | 3 - OPEN VENT 120 | 4 - CLOSE VENT 120 | 5 - FAN 145 | 6 - IGNITER 125 |
|---|---|---|---|---|---|---|
| 1 - BURNER OFF | | | | | | |
| 2 - VENT | | | 304B | | 304A | |
| 3 - TURN ON GAS | | | | | 304C | |
| 4 - IGNITE | | | | | | |
| 5 - NORMAL OPERATION | | | | | | |
| 6 - TURN OFF GAS | | | | | | |
| 7 - VENT | | | | | | |

| OUTPUTS / STATES | 1 - OPEN VALVE 101 | 2 - CLOSE VALVE 101 | 3 - OPEN VENT 120 | 4 - CLOSE VENT 120 | 5 - FAN 145 | 6 - IGNITER 125 |
|---|---|---|---|---|---|---|
| 1 - BURNER OFF | | | | | | |
| 2 - VENT | | | X | | X | |
| 3 - TURN ON GAS | X | | | | X | |
| 4 - IGNITE | | | | X | | X |
| 5 - NORMAL OPERATION | | | | | | |
| 6 - TURN OFF GAS | | X | | | | |
| 7 - VENT | | | X | | X | |

FIG. 6

STATE MACHINE FUNCTION BLOCK WITH A USER MODIFIABLE OUTPUT CONFIGURATION DATABASE

CROSS REFERENCES TO RELATED APPLICATIONS

The present application is related to U.S. patent application Ser. No. 10/656,005, entitled "STATE MACHINE FUNCTION BLOCK WITH A USER MODIFIABLE STATE TRANSITION CONFIGURATION DATABASE," which is commonly-owned, and which is hereby incorporated by reference herein in its entirety for all purposes.

FIELD OF THE DISCLOSURE

The present disclosure generally relates to function blocks for use in process plants, and more particularly to configuring and implementing a state machine associated with a process plant.

BACKGROUND

Process control systems, like those used in chemical, petroleum or other processes, typically include one or more process controllers communicatively coupled to at least one host or operator workstation and to one or more field devices via analog, digital or combined analog/digital buses or lines. The field devices, which may be, for example valves, valve positioners, switches and transmitters (e.g., temperature, pressure and flow rate sensors), perform functions within the process plant such as opening or closing valves and measuring process parameters. The process controllers receive signals indicative of process measurements made by the field devices and/or other information pertaining to the field devices, use this information to implement control routines and then generate control signals which are sent over the buses or lines to the field devices to control the operation of the process. Information from the field devices and the controllers is typically made available to one or more applications executed by the operator workstation to enable an operator to perform any desired function with respect to the process, such as configuring the process, viewing the current state of the process, modifying the operation of the process, etc.

Additionally, in many processes, a separate safety system is provided to detect significant safety related problems within the process plant and to automatically close valves, remove power from devices, switch flows within the plant, etc., when a problem occurs which might result in or lead to a serious hazard in the plant, such as a spill of toxic chemicals, an explosion, etc. These safety systems typically have one or more separate controllers apart from the standard process control controllers, called logic solvers, which are connected to safety field devices via separate buses or communication lines installed within the process plant. The logic solvers use the safety field devices to detect process conditions associated with significant events, such as the position of certain safety switches or shutdown valves, overflows or underflows in the process, the operation of important power generation or control devices, the operation of fault detection devices, etc. to thereby detect "events" within the process plant. When an event (typically called a "cause") is detected, the safety controller takes some action (typically called an "effect") to limit the detrimental nature of the event, such as closing valves, turning devices off, removing power from sections of the plant, etc. Generally, these actions or effects include switching safety devices into a tripped or "safe" mode of operation which is designed to prevent a serious or hazardous condition within the process plant.

Systems within a process plant, such as process control systems and safety systems, typically may keep track statuses of various processes and/or the systems themselves. Input signals to a system may cause the status tracked by the system to change, and output signals generated by the system may depend on the current status of the system in addition to input signals to the system. Currently, the status of a system may be tracked using routines written in a programming language. Writing such routines can be tedious, time consuming and fraught with errors. In safety systems, such errors can be serious because a failure of the safety system to operate properly can lead to serious injury or even death on the part of plant personnel and to the destruction of potentially millions of dollars of equipment and material within a plant.

Also, the status of a system can be tracked using a programming technique for programmable controllers standardized by the International Electrotechnical Commission (IEC), commonly referred to as a "sequential function chart" (set forth in the IEC 61131-3 standard). But as is known to those of ordinary skill in the art, using a sequential function chart to keep track of the status of a system can be difficult. Additionally, similar to the routines written in a programming language, creating a sequential function chart can be tedious, time consuming and fraught with errors.

SUMMARY

A control system, a safety system, etc., within a process plant may each use one or more state machine function blocks that can be easily integrated into a function block diagram programming environment. Such a state machine function block may include one or more inputs, which may or may not cause a state machine implemented by the state machine function block to change states. The state machine function block may also include a plurality of outputs. Output configuration data associated with the function block may indicate values of the outputs of the function block for each of the states of the state machine. The state machine function block may use this output configuration data to determine its outputs when in a particular state. The inputs of the state machine function block may be associated with, for example, a process control system or a safety system, and the outputs may be used, for example, for control of field devices in the process control system or the safety system.

The state machine function block may be configured, at least in part, via a graphical user interface mechanism. The graphical user interface mechanism may include a plurality of graphical elements, wherein at least some of the graphical elements can be used to specify the values of outputs of the function block in various states of the state machine. In one example, the graphical elements may include a plurality of cells, where each cell corresponds to a respective pair of an output and a state. The plurality of cells may be arranged in a matrix, for example, where rows of the matrix correspond to the possible states of the state machine, and columns of the matrix correspond to outputs of the state machine (or vice versa). In a cell corresponding to a particular state and a particular output, a programmer may enter configuration data, using an input device of a computer, indicative of a desired value of the output when the state machine is in the corresponding state.

Embodiments of state machine function blocks as claimed herein may be easier to configure as compared to prior art techniques of keeping track of a status related to a control system or a safety system. For instance, some or all of the configuration may be accomplished using a graphical user interface mechanism such as the mechanism described above. Additionally, embodiments of state machine function blocks may be easy to integrate into a controller, a logic solver, field devices, etc., which use function block logic because the state machine function block can be integrated in the same or similar manner as other types of function blocks by interconnecting inputs and outputs of the state machine function block to other functions blocks, elements within a control strategy, etc. Further, the operation of the state machine function may be easily documented because its operation may be illustrated, at least in part, graphically such as in a matrix form. Embodiments of state machine function blocks or mechanisms for configuring state machine function blocks may provide one or more, or none of the above-described advantages.

BRIEF DESCRIPTION OF THE DRAWINGS

The features and advantages of the methods, apparatus, and systems described herein will be best appreciated upon reference to the following detailed description and the accompanying drawings, in which:

FIG. 5 is an example matrix for entering output configuration data for a state machine function block;

FIG. 6 is the example matrix of FIG. 5 in which output configuration data is displayed in the matrix;

DETAILED DESCRIPTION

Process Plant Example

Figure 1:
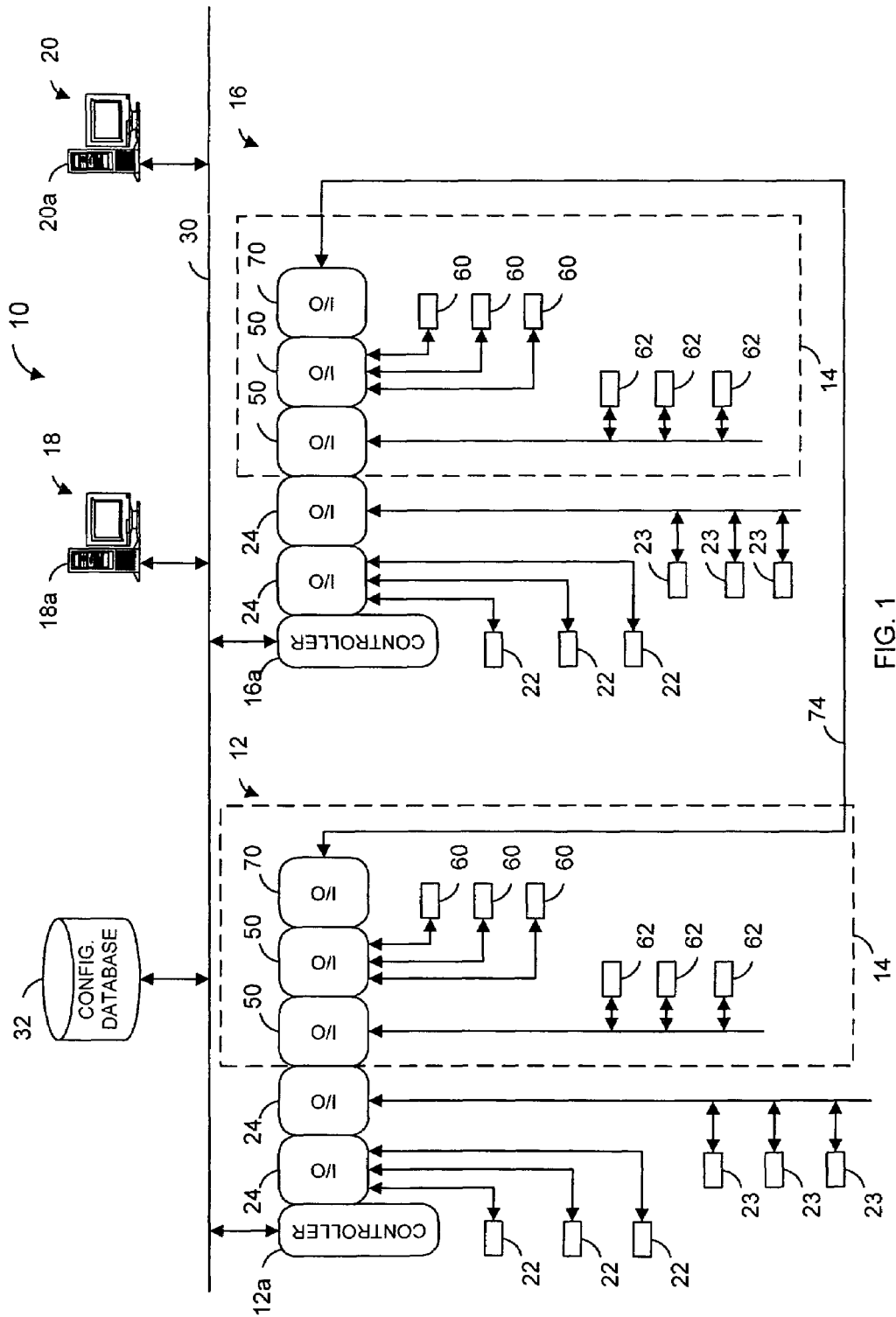
FIG. 1 is a block diagram of an example process plant.

FIG. 1 is a block diagram of an example process plant 10 that includes one or more nodes 12, 16, 18 and 20. In the example process plant 10 of FIG. 1, each of the nodes 12 and 16 includes a process controller 12*a*, 16*a* connected to one or more field devices 22 and 23 via input/output (I/O) devices 24 which may be, for example, Foundation Fieldbus interfaces, HART interfaces, etc. The controllers 12*a* and 16*a* are also coupled to one or more host or operator workstations 18*a* and 20*a* in the nodes 18 and 20 via a network 30 which may comprise, for example, one or more of a bus, a wired local area network (LAN) such as an Ethernet LAN, a wireless LAN, a wide area network (WAN), an intranet, etc. While the controller nodes 12, 16 and the I/O devices 24 and field devices 22, 23 associated therewith are typically located down within and distributed throughout the sometimes harsh plant environment, the operator workstation nodes 18 and 20 are usually located in control rooms or other less harsh environments easily assessable by controller personnel.

Generally speaking, the workstations 18*a* and 20*a* of the nodes 18 and 20 may be used to store and execute applications used to configure and monitor the process plant 10, and/or to manage devices 22, 23, 24 and controllers 12*a*, 16*a* in the process plant 10. Further, a database 32 may be connected to the network 30 and operate as a data historian and/or a configuration database that stores the current configuration of the process plant 10 as downloaded to and/or stored within the nodes 12, 16, 18, 20, 22, 23, 24, 50, and 70.

Each of the controllers 12*a* and 16*a*, which may be by way of example, the DeltaV™ controller sold by Emerson Process Management, may store and execute a controller application that implements a control strategy using a number of different, independently executed, control modules or blocks. The control modules may each be made up of what are commonly referred to as function blocks wherein each function block is a part or a subroutine of an overall control routine and operates in conjunction with other function blocks (via communications called links) to implement process control loops within the process plant 10. As is well known, function blocks typically perform one of an input function (such as that associated with a transmitter, a sensor or other process parameter measurement device), a control function (such as that associated with a control routine that performs PID, fuzzy logic, etc. control), or an output function which controls the operation of some device (such as a valve), to perform some physical function within the process plant 10. Of course hybrid and other types of function blocks exist and may be utilized. While a fieldbus protocol and the DeltaV™ system protocol may use control modules and function blocks designed and implemented in an object oriented programming protocol, the control modules could be designed using any desired control programming scheme including, for example, sequential function block, ladder logic, etc. and are not limited to being designed using function block or any other particular programming technique. As is typical, the configuration of the control modules as stored within the process control nodes 12 and 16 may be stored in the configuration database 32 which is accessible to applications executed by the workstations 18*a* and 20*a*. Function blocks may be stored in and executed by, for example, the controller 12*a*, 16*a* which is typically the case when these function blocks are used for, or are associated with standard 4-20 ma devices and some types of smart field devices such as HART devices, or may be stored in and implemented by the field devices themselves, which can be the case with Fieldbus devices.

In the system illustrated in FIG. 1, the field devices 22 and 23 coupled to the controllers 12*a* and 16*a* may be standard 4-20 ma devices, or may be smart field devices, such as HART, Profibus, or Foundation Fieldbus field devices, which include a processor and a memory. Some of these devices, such as Foundation Fieldbus field devices (labeled with reference number 23 in FIG. 1), may store and execute modules, or sub-modules, such as function blocks, associated with the control strategy implemented in the controllers 12*a* and 16*a*. Of course, the field devices 22, 23 may be any types of devices, such as sensors, valves, transmitters, positioners, etc. and the I/O devices 24 may be any types of I/O devices conforming to any desired communication or controller protocol such as HART, Foundation Fieldbus, Profibus, etc.

The controllers 12*a* and 16*a* each include a processor that implements or oversees one or more process control routines, stored in a memory, which may include control loops, stored therein or otherwise associated therewith. The controllers 12*a* and 16*a* communicate with the field devices 22, 23, the workstations 18*a*, 20*a* and the database 32 to control a process in any desired manner. The controllers 12*a* and 16*a* each may be configured to implement a control strategy or control routine in any desired manner.

The process plant 10 may also include a safety system 14 (indicated by dotted lines) integrated with the process control nodes 12 and 16. The safety system 14 generally may operate as a Safety Instrumented System (SIS) to monitor and override the control provided by the process control nodes 12 and 16 to maximize the likely safe operation of the process plant 10.

Each of the nodes 12 and 16 may include one or more safety system logic solvers 50. Each of the logic solvers 50 is an I/O device having a processor and a memory, and is configured to execute safety logic modules stored in the memory. Each logic solver 50 is communicatively coupled to provide control signals to and/or receive signals from safety system field devices 60 and 62. Additionally, each of the nodes 12 and 16 includes at least one message propagation device (MPD) 70, which is communicatively coupled to other MPDs 70 via a ring or bus connection 74 (only part of which is illustrated in FIG. 1). The safety system logic solvers 50, the safety system field devices 60 and 62, the MPDs 70, and the bus 74 generally make up the safety system 14 of FIG. 1.

The logic solvers 50 of FIG. 1 may be any desired type of safety system control devices that include a processor and a memory that stores safety logic modules adapted to be executed on the processor to provide control functionality associated with the safety system 14 using the field devices 60 and 62. Of course, the safety field devices 60 and 62 may be any desired type of field devices conforming or using any known or desired communication protocol, such as those mentioned above. In particular, the field devices 60 and 62 may be safety-related field devices of the type that are conventionally controlled by a separate, dedicated safety-related control system. In the process plant 10 illustrated in FIG. 1, the safety field devices 60 are depicted as using a dedicated or point-to-point communication protocol, such as the HART or the 4-20 ma protocol, while the safety field devices 62 are illustrated as using a bus communication protocol, such as a Fieldbus protocol. The safety field devices 60 may perform any desired function, such as that of a shut-down valve, a shut-off switch, etc.

A common backplane (not shown) may be used in each of the nodes 12 and 16 to communicatively couple the controllers 12*a* and 16*a* to the process control I/O cards 24, to the safety logic solvers 50, and to the MPDs 70. The controllers 12*a* and 16*a* are also communicatively coupled to the network 30. The controllers 12*a* and 16*a*, the I/O devices 24, the logic solvers 50, the MPDs 70 may communicate with the nodes 18 and 20 via the network 30.

As will be understood by those of ordinary skill in the art, the backplane (not shown) in the node 12, 16 enables the logic solvers 50 to communicate locally with one another to coordinate safety functions implemented by these devices, to communicate data to one another, and/or to perform other integrated functions. Similarly, the backplane (not shown) in the node 16 enables the logic solvers 50 to communicate locally with one another to coordinate safety functions implemented by these devices, to communicate data to one another, and/or to perform other integrated functions. On the other hand, the MPDs 70 operate to enable portions of the safety system 14 that are disposed in vastly different locations of the plant 10 to still communicate with one another to provide coordinated safety operation at different nodes of the process plant 10. In particular, the MPDs 70 in conjunction with the bus 74 enable the logic solvers 50 associated with different nodes 12 and 16 of the process plant 10 to be communicatively cascaded together to allow for the cascading of safety-related functions within the process plant 10 according to an assigned priority. The MPDs 70 and the bus 74 provide the safety system with a communication link that is an alternative to the network 30.

Alternatively, two or more safety-related functions at different locations within the process plant 10 may be interlocked or interconnected without having to run a dedicated line to individual safety field devices within the separate areas or node of the plant 10. In other words, the use of the MPDs 70 and 72 and the bus 74 enables a safety engineer to design and configure a safety system 14 that is distributed in nature throughout the process plant 10 but that has different components thereof communicatively interconnected to enable the disparate safety related hardware to communicate with each other as required. This feature also provides scalability of the safety system 14 in that it enables additional safety logic solvers to be added to the safety system 14 as they are needed or as new process control nodes are added to the process plant 10.

Figure 2:
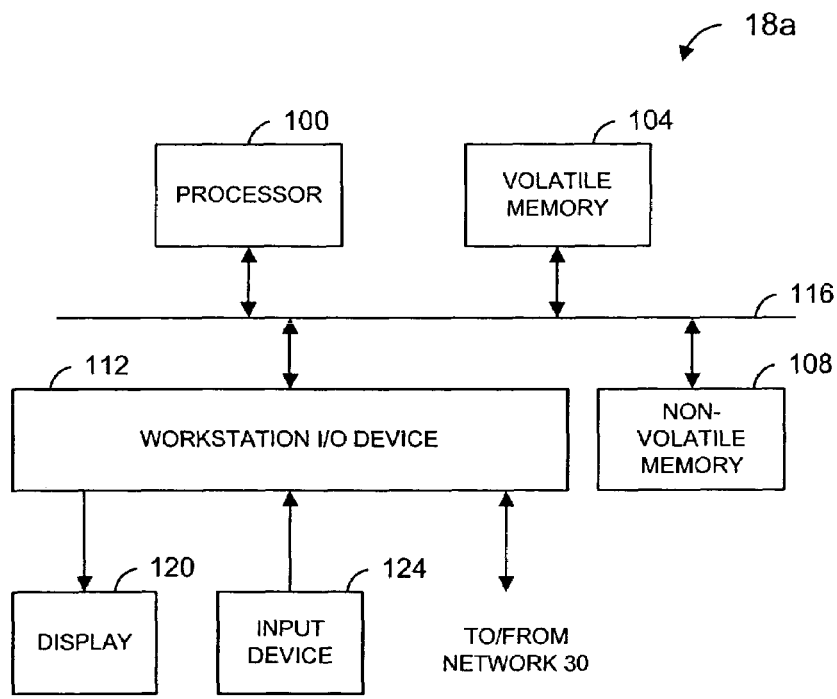
FIG. 2 is a block diagram of an example workstation schematically illustrated in FIG. 1.

FIG. 2 is a block diagram of an example workstation 18*a* (workstation 20*a* may comprise the same or similar device). The workstation 18*a* may include at least one processor 100, a volatile memory 104, and a non-volatile memory 108. The volatile memory 104 may include, for example, a random access memory (RAM). In some embodiments, the RAM may be backed up by one or more batteries so that data is not lost in the event of a power failure. The non-volatile memory 108 may include, for example, one or more of a hard disk, a read-only memory (ROM), a compact disk ROM (CD-ROM), a programmable ROM (PROM), an erasable programmable ROM (EPROM), an electrically erasable programmable ROM (EEPROM), a digital versatile disk (DVD), a flash memory, etc. The Workstation 18*a* may also include a workstation I/O device 112. The processor 100, volatile memory 104, non-volatile memory 108, and workstation I/O device 112 may be interconnected via an address/data bus 116. The workstation 18*a* may also include at least one display device 120 and at least one user input device 124, which may be, for example, one or more of a keyboard, a keypad, a mouse, a track ball, a touch screen, a light pen, etc. In some embodiments, one or more of the volatile memory 104, non-volatile memory 108, and workstation I/O device 112 may be coupled to the processor 100 via a bus separate from the address/data-bus 116 (not shown), or may be coupled directly to the processor 100.

The display device 120 and the user input device 124 are coupled with the workstation I/O device 112. Additionally, the workstation 18*a* is coupled to the network 30 via the workstation I/O device 112. Although the workstation I/O device 112 is illustrated in FIG. 2 as one device, it may comprise several devices. Additionally, in some embodiments, one or more of the display device 120 and the user input device 124 may be coupled directly to the address/data bus 116 or to the processor 100.

Referring now to FIGS. 1 and 2, a process control configuration application associated with one or more of the control nodes 12, 16 may be stored on and executed by one or more of workstations 18a and 20a. For example, the process control configuration application could be stored on the non-volatile memory 108 and/or the volatile memory 104, and executed by the processor 100. However, if desired, this application could be stored and executed in other computers associated with the process plant 10. Generally speaking, the process control configuration application permits a programmer to create and configure control routines, control modules, function blocks, programs, logic, etc., to be implemented by the controllers 12a, 16a, I/O devices 24, and/or the field devices 22, 23. These control routines, control modules, function blocks, programs, logic, etc., may then be downloaded to appropriate ones of the controllers 12a, 16a, I/O devices 24, and/or field devices 22, 23 via the network 30.

Similarly, a safety system configuration application associated with the safety system 14 may be stored on and executed by one or more of workstations 18a and 20a. For example, the safety system configuration application could be stored on the non-volatile memory 108 and/or the volatile memory 104, and executed by the processor 100. However, if desired, this application could be stored and executed in other computers associated with the process plant 10. Generally speaking, the safety system configuration application permits a programmer to create and configure control routines, control modules, function blocks, programs, logic, etc., to be implemented by the controllers 12a, 16a, the logic solvers 50, and/or the devices 60, 62. These control routines, control modules, function blocks, programs, logic, etc., may then be downloaded to appropriate ones of the controllers 12a, 16a, the logic solvers 50, and/or the devices 60, 62 via the network 30.

State Machine Function Block

Figure 3:
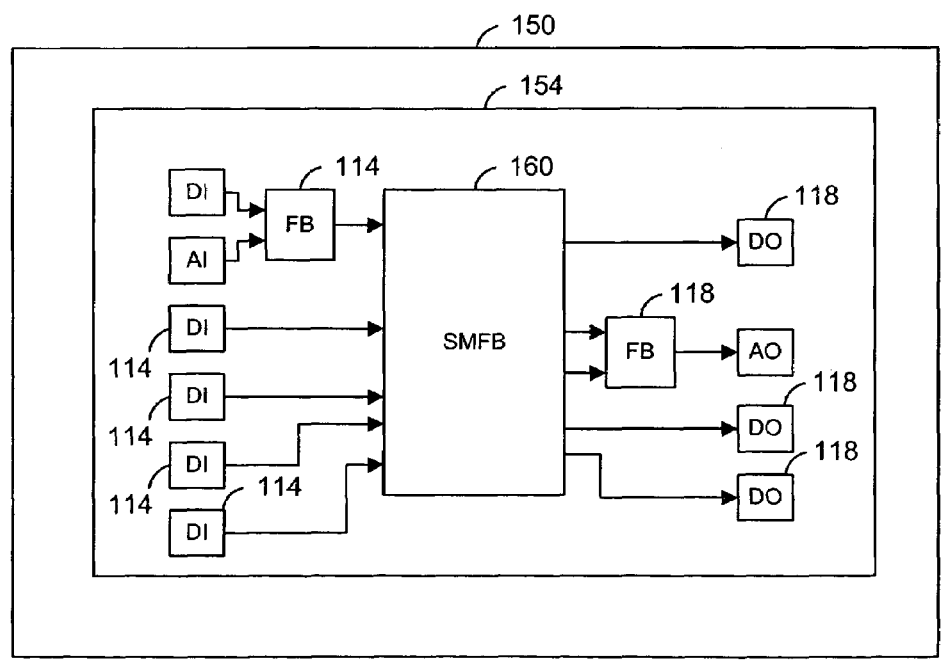
FIG. 3 is an example of a display that depicts a control module.

A control system or safety system configuration application may permit programming control modules and/or control routines using a function block programming paradigm. FIG. 3 illustrates one example of a display 150 depicting a control module 154. The display 150 may be part of a user interface associated with the configuration application, and the display 150 may be presented to a programmer, for example, via the display device 120 of the workstation 18a. The display 150 depicts the control module 154 having a set of communicatively interconnected function blocks that can be created and downloaded to appropriate ones of the controllers 12a, 16a, I/O devices 24, logic solvers 50, and/or devices 22, 23, 60, 62 via the network 30 for implementation during operation of a process plant. As illustrated in FIG. 3, the control module 154 includes a state machine function block (SMFB) 160, a plurality of analog input (AI) and digital input (DI) function blocks, a plurality of analog output (AO) and digital output (DO) function blocks, and other function blocks (FBs). The SMFB 160 has inputs communicatively interconnected with function blocks 114, which may be, for example, DI function blocks or other FBs. The SMFB 160 also has outputs connected to function blocks 118 which may be, for example, DO function blocks or other FBs. The control module 154 may control, or may be one of a plurality of control modules that together control, devices such as switches, valves, etc., as part of a control system, safety system, etc. Of course, control module 154 is just one example of a control module that employs SMFBs. In general, a control module may be programmed in any desired manner to include any types of function blocks communicatively coupled with any number of SMFBs in any desired manner, and configured in any desired or useful manner to perform any desired functionality. If used in, for example, a Fieldbus network, a control module may include any fieldbus type function blocks.

In some embodiments, one or more of the inputs to the SMFB 160 may be received from other than a function block. For example, one or more of the inputs to the SMFB 160 may be communicatively coupled to receive inputs from an operator via, for example, an operator interface. For example, an operator, using an operator interface implemented on a node such as node 18 or 20, could provide inputs to the SMFB 160.

The SMFB may be a function block that implements a state machine. In some embodiments, a state machine may include an entity (e.g., a device, software implemented by a processor, etc.) that can be in one of a plurality of states. The state machine may transition from one state to another state if a particular input to the state machine occurs. The SMFB may provide outputs that are based on the current state of the state machine. As just one example, the SMFB may provide one or more outputs that indicate the current state of the state machine. More generally, a state machine may include an entity (e.g., a device, software implemented by a processor, etc.) that stores a status of the entity, or some other entity (e.g., a process plant, a sub-part of a process plant, a component of a process plant, etc.), at a given time, and that may change the status and/or cause an action or output to take place based on inputs to the state machine.

Using the user interface associated with the configuration application, the programmer may design a control module such as the control module 154. As just one example, the user interface may provide a mechanism for a programmer to select desired function blocks from, for example, a stencil or palette that includes a plurality of standard or customized function block stencils. Additionally, the user interface may provide a graphical diagram onto which the programmer may insert or place depictions of function blocks. The programmer may use, for example, a mouse, a track ball, a keyboard, a key pad, a touch screen, etc., to select a function block from the stencil or palette, and then "drag and drop" the function block onto the graphical diagram. The programmer may additionally communicatively couple function blocks by, for example, drawing a line between an output of one function block and an input of another function block using, for example, a mouse, a track ball, a keyboard, a key pad, a touch screen, etc.

Once configured, the control module 154 may be implemented, for example, by one or more of the controllers 12a, 14a, 16a, I/O devices 24, logic solvers 50, and devices 22, 23, 60, 62.

Figure 4:
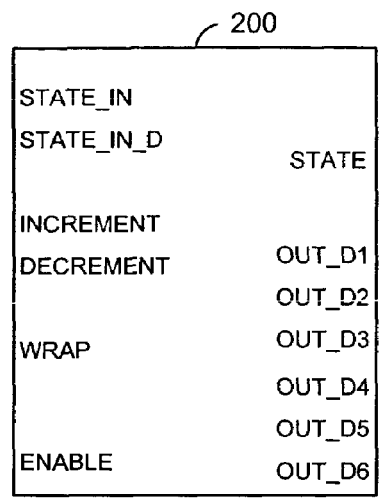
FIG. 4 is an example of a representation of a state machine logic block.

FIG. 4 is one example of a representation of a SMFB 200 which may be displayed, for example, on a user interface display such as the display 150 of FIG. 3. The representation of the SMFB 200 indicates that the SMFB 200 includes several inputs and outputs. The inputs include an INCREMENT input can be used to cause the state machine implemented by the SMFB 200 to increment the state (e.g., if in state 4, transition to state 5). Similarly, a DECREMENT input can be used to cause the state machine to decrement the state (e.g, if in state 4, transition to state 3). The SMFB 200 may optionally include a WRAP input. The WRAP input indicates how the state machine should handle an INCREMENT input when the state machine is in a highest enabled state, and how it should handle a DECREMENT input when the state machine is in a lowest enabled state. As one example, if the WRAP input is asserted, if the state machine is in the highest enabled state, and if the INCRE- MENT input is asserted, the state machine should transition to the lowest enabled state (e.g., if in state 6, transition to state 1). But if the WRAP input is not asserted, if the state machine is in the highest enabled state, and if the INCREMENT input is asserted, the state machine may not transition to another state (e.g., if in state 6, stay in state 6). Similarly, if the WRAP input is asserted, if the state machine is in the lowest enabled state, and if the DECREMENT input is asserted, the state machine should transition to the highest enabled state (e.g., if in state 1, transition to state 6). But if the WRAP input is not asserted, if the state machine is in the lowest enabled state, and if the DECREMENT input is asserted, the state machine may not transition to another state (e.g., if in state 1, stay in state 1).

The SMFB 200 may also include a STATE_IN input and a STATE_IN_D input, which may be used to force the state machine implemented by the SMFB 200 into a desired state. Also, an ENABLE input may be used to force the state machine into a disabled state and/or an initial state. These inputs will be described in more detail below.

The SMFB 200 also includes a STATE output, which is an indicator of the state (e.g., state 1, state 2, state 3, etc.) of the state machine. Also, outputs OUT_D1, OUT_D2, . . . OUT_D6 are outputs that are based on the current state of the state machine. Generation of the outputs OUT_D1, OUT_D2, . . . OUT_D6 will be described in more detail below.

The SMFB 200 is merely one example of a state machine function block. Other examples may include some, none, or all of the inputs and outputs of the SMFB 200. Additionally, other inputs and/or outputs may be provided as well. The types and/or numbers of inputs and outputs may or may not be configurable. In one example, the number of outputs OUT_Dx may be configurable. In another example, the number of outputs OUT_Dx is not configurable. For example, if there are fewer outputs needed than the number of outputs OUT_Dx provided by the SMFB 200, the extra OUT_Dx outputs could be left unused (e.g., not connected to other function blocks, connected to dummy function blocks, etc.).

Using a graphical user interface associated with the configuration program, the programmer may configure one or more function blocks such as the SMFB 200. With regard to configuring a SMFB such as the SMFB 200, the programmer may specify a number of states of a state machine to be implemented by the SMFB. Also, the programmer may specify a number of outputs OUT_Dx, and what values those outputs should take for the various states of the state machine. To allow a programmer to configure the SMFB, a configuration application may display on the display device 120 a user interface mechanism, such as a configuration window, screen, etc., associated with the function block.

FIG. 5 is one example of a user interface mechanism that may be used to configure, at least in part, a SMFB, such as the SMFB 200 of FIG. 4. The user interface mechanism comprises a table or matrix 300 (hereinafter referred to as the "matrix 300") that may be displayed as part of a configuration window, screen, etc., associated with the SMFB. The matrix 300 comprises a plurality of cells 304 arranged in rows and columns. Each row corresponds to one of a plurality of possible states of the state machine, and each column corresponds to an output OUT_Dx of the state machine. Thus, each cell 304 corresponds to a state and an output. Although the example matrix 300 includes rows for seven states and columns for six outputs, similar matrices having different numbers of states and outputs may be used for SMFBs having different numbers of outputs and states.

For example, cell 304A corresponds to state 1 and output OUT_D5. Cell 304B corresponds to state 2 and output OUT_D3, and cell 304C corresponds to state 2 and output OUT_D5.

The number of outputs and states may be configurable. In other examples, each column may correspond to one of a plurality of possible states of the state machine, and each row may correspond to an output of the state machine.

Referring to FIG. 4, the outputs "1" through "6" of matrix 300 correspond to the outputs OUT_D1 through OUT_D6 of the SMFB 200 of FIG. 4 respectively. Additionally, in this example a programmer may be able to label each possible state and/or each of the outputs. For example, in FIG. 5 "state 1" is labeled "BURNER OFF," and input 1 is labeled "OPEN VALVE 101". Labeling outputs and/or states may help facilitate understanding the operation of the state machine.

A programmer may configure the SMFB by entering configuration information into the cells 304. In particular, for a particular cell 304 that corresponds to one of the states and one of the outputs, the programmer can enter configuration data into the cell that indicates the value that the corresponding output should be when the state machine is in the corresponding state. FIG. 6 is an example of the matrix 300 having configuration data entered into some of the cells 304. For example, the cell 304A includes configuration data indicative of the value of the output "FAN 145" when the state machine is in the state "BURNER OFF". In particular, the cell 304A includes an "X". This may indicate that the corresponding output should be asserted. Cells 304 that do not include an "X" may indicate that these outputs should be deasserted in the corresponding states. Alternatively, an "X" could indicate that the corresponding output should be deasserted, and the absence of an "X" could indicate that the corresponding output should be asserted. In some examples, different configuration data may indicate whether an output should be asserted or deasserted. For example, a "0", "FALSE", "DEASSERT", etc., value may indicate that the output should be deasserted and/or a "1", "TRUE", "ASSERT", etc. may indicate that the output should be asserted. In other examples, configuration data could indicate that an output should be set to one of three or more values. Any suitable indicator may be used besides an "X, such as other letters, words, numbers, symbols, patterns, icons, a filled-in cell, etc.

Similarly, the cell 304B includes configuration data that indicates when the state machine is in the state 2, the "OPEN VENT 120" output should be asserted. Also, cell 304C includes configuration data that indicates when the state machine is in the state 2, the "FAN 145" output should be asserted.

The programmer may enter configuration data into the matrix 300 using any of a variety of techniques, including techniques well known to those of ordinary skill in the art. For example, to enter configuration data into a cell 304, the programmer may select the cell 304 using a mouse, track ball, touch screen, etc. Then, the user could enter configuration data directly into the cell 304 via, for example, a keyboard. Alternatively, the programmer could select the cell 304 and then select an "edit," a "modify," etc., selection from a pull-down menu, or select an "edit" button, a "modify" button, etc. Then, the user interface may display to the programmer a list of output values via a pull down menu, window, display screen, etc. Next, the programmer may select one of the output values using, for example, a keyboard, a mouse, a trackball, a touch screen, etc.

Configuring the SMFB using a user interface that includes a matrix such as the matrix 300 may make implementing a state machine easier as compared to using, for example, a sequential function chart or a programming language such as C++. For instance, implementing a state machine using a C++ program likely would involve first creating a state transition diagram and then converting that into a program. Then, the program would have to be tested and debugged. With a SMFB configured using matrix such as the matrix 300, however, no writing of a program is required. Rather, "programming" would simply involve filling in the matrix. Additionally, because no software code need be written, debugging and testing of the code is not needed. Rather, testing may simply involve testing the various combinations of states, inputs, and outputs to verify that the SMFB goes to the correct next states, and that, for each state, the correct outputs are generated.

Further, the functioning of the SMFB can be easily understood by simply examining the matrix 300. Thus, the functioning of a configured SMFB could easily be documented by, for example, printing out a representation of the matrix.

A SMFB configured according to a matrix such as the matrix 300 can be used in a safety system or a process control system, for example. As just one example, SMFB configured according to a matrix such as the matrix 300 can be used, as part of a safety system, for managing a burner in a process plant. Referring to FIG. 6, for instance, the SMFB could include states such as "NORMAL OPERATION", "TURN OFF GAS", and "VENT". If it was detected that the burner flame went out, the SMFB could be controlled to increment from the "NORMAL OPERATION" state to the "TURN OFF GAS" state. In the "TURN OFF GAS" state, the SMFB would generate an output OUT_D2 to shut off the gas. Then, the SMFB could be controlled to go to the "VENT" state, which would generate outputs OUT_D3 and OUT_D5 to open a vent and turn on a fan. This could be used to vent any residual gas in the burner.

A SMFB configured according to a matrix such as the matrix 300 can be implemented by one or more of the controllers 12*a*, 16*a*, I/O devices 24, logic solvers 50, and devices 22, 23, 60, 62. In some embodiments, the SMFB, may be implemented by a processor configured according to software, by a programmable logic device, e.g., a device including one or more of a gate array, a standard cell, a field programmable gate array (FPGA), a PROM, an EPROM, an EEPROM, a programmable array logic (PAL), a programmable logic array (PLA), etc.

The configuration data associated with a SMFB (for example, data entered into a matrix such as the matrix 300 and, optionally, other configuration data) may be stored on a computer readable medium such as a hard disk, a RAM, a ROM, a CD-ROM, an EPROM, an EEPROM, a DVD, a FLASH memory, etc., and/or a memory associated with a processor.

Figure 7:
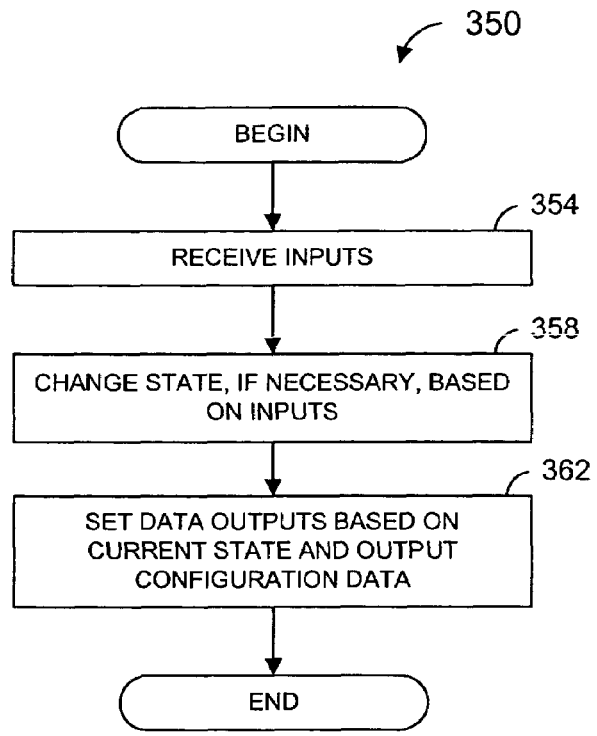
FIG. 7 is a flow diagram of an example method of operation of a state machine function block.

FIG. 7 is a flow diagram of an example method of operation of a configured SMFB. The method 350 may be implemented periodically and/or in response to a triggering event, for example. At a block 354, the SMFB receives inputs from, for example, other function blocks, an operator interface, a control strategy, etc. Referring to FIG. 4 for instance, the SMFB receives inputs such as INCREMENT, DECREMENT, STATE_IN, STATE_IN_D, etc. At a block 358, the SMFB may change to a different state from its current state, if necessary. A state change, if any, may be based on the inputs received at the block 354, and, optionally, on other factors as well. For example, in some embodiments inputs to the SMFB may include a status (e.g., GOOD status or BAD status). Thus, determining the next state may also be based on, for example, configuration data that indicates how an input having a BAD status should be handled. Inputs with status information will be described in more detail below.

Then, at a block 362, the SMFB may generate outputs (e.g., OUT_D1, OUT_D2, etc.) based on the current state of the state machine. Optionally, the outputs may be generated based on other factors as well. For example, in some embodiments, the SMFB may be configured so that some or all of the outputs are forced to a particular value irrespective of the state of the state machine.

Referring again to FIG. 4, the SMFB may optionally include an "ENABLE" input. In one embodiment, if the ENABLE input is deasserted, the SMFB may be forced into a disabled state (e.g., state 0) and should remain in that state until the ENABLE input is asserted. When the ENABLE input is then asserted, the SMFB may be forced into an initial state (e.g., state 1) after which the SMFB may transition to other states based on the inputs to the SMFB and, optionally, other factors.

The SMFB may additionally include an input or inputs to force the state machine into a desired state. For example, the SMFB 200 includes a STATE_IN_D input and a STATE_IN input. When the STATE_IN_D input is asserted, the SMFB may be forced into a state specified by the STATE_IN input. For example, if the STATE_IN input is "6" and the STATE_IN_D input is asserted, the SMFB may be forced into the state "6."

The SMFB may optionally be configured in additional ways. For example, the SMFB may include an output "mask" that indicates whether any of the outputs OUT_D1, OUT_D2, etc., should be forced into a particular state irrespective of the state of the state machine and the configuration data entered in to the configuration matrix. For example, the output mask may be used to force one or more of the outputs OUT_D1, OUT_D2, etc., to be always deasserted. Also, the SMFB may be configured to respond to inputs that may have a plurality of statuses. For instance, one or all of the inputs to the SMFB may have a "good" status or a "bad" status, and the SMFB may be configured to respond differently depending on the status of an input. In one particular example, the SMFB may be configured to ignore an input that is "bad," use the input even if it is "bad," or use the last "good" value of the input. Further, the SMFB may include a RESET parameter that, when true, forces the SMFB into the "1" state.

Figure 8:
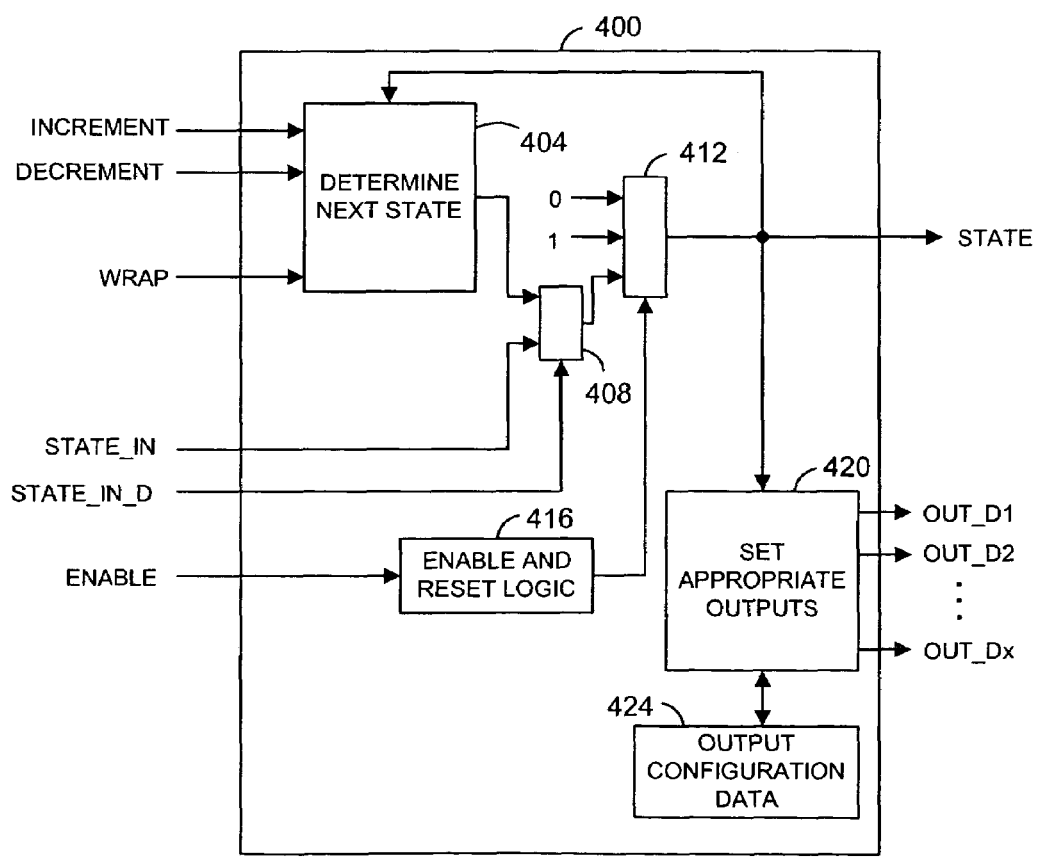
FIG. 8 is a block diagram of an example state machine function block.

FIG. 8 is a block diagram of one example of a SMFB. The SMFB 400 includes logic 404 that determines a next state based, at least in part, on the inputs INCREMENT, DECREMENT, and WRAP, and the current state of the SMFB 400. For instance, if the INCREMENT input is asserted, the logic 404 may increment the current state to a next higher state. If the current state is already in a highest enabled state and the WRAP input is asserted, the logic 404 may set the current state to a lowest enabled state (e.g, if current state is 7, then set state to 1). If the current state is already in the highest enabled state and the WRAP input is deasserted, the logic 404 may leave the state unchanged (e.g, if current state is 7, keep it at 7). Similarly, if the DECREMENT input is asserted, the logic 404 may decrement the current state to a next lower state. If the current state is already in the lowest enabled state and the WRAP input is asserted, the logic 404 may set the current state to the highest enabled state (e.g, if current state is 1, then set state to 7). If the current state is already in the lowest enabled state and the WRAP input is deasserted, the logic 404 may leave the state unchanged (e.g., if current state is 1, keep it at 1).

The output of the logic 404 is provided to switching logic 408. The switching logic 408 selects between the output of the logic 404 and the input STATE_IN based on the STATE_IN_D input. For example, if the STATE_IN_D input is asserted, the switching logic 408 may select the STATE_IN input. Otherwise, the switching logic 408 may select the output of the logic 404.

The output of the switching logic 408 is provided to switching logic 412, which selects between the output of the switching logic 408, the value 0 and the value 1 based on the output of enable and reset logic 416. The output of the enable and reset logic 416 is indicative of whether the state should be forced into a disabled state (e.g., state 0) or an initial state (e.g., state 1). The enable and reset logic 416 generates this output based on the ENABLE input. For example, if the ENABLE input is deasserted, the output of the enable and reset logic 416 may indicate that the state should be forced to state 0. If the ENABLE input changes from deasserted to asserted, the output of the enable and reset logic 416 may indicate that the state should be forced to state 1. If the ENABLE input is asserted and was previously asserted, the output of the enable and reset logic 416 may indicate that the state should not be forced to states 0 or 1.

The output of the switching logic 412 is the current state of the SMFB 400, and may be provided as an output of the SMFB 400. The output of the switching logic 412 may also be provided to logic 420 that sets appropriate outputs OUT_D1, OUT_D2, etc., based on the current state of the state machine. In particular, the logic 420 accesses output configuration data stored in a output configuration database 424. The database 424 may be stored on a computer readable medium such as a hard disk, a RAM, a ROM, a CD-ROM, an EPROM, an EEPROM, a DVD, a FLASH memory, etc., and/or a memory associated with a processor. The output configuration data may comprise configuration data entered into a matrix such as the matrix 300 of FIG. 5.

Each of the blocks 404, 408, 412, 416, and 420 may be implemented by one or more of hardware, software, and firmware. Additionally, some of the blocks may be combined, reordered, modified, or omitted, and additional blocks may be added. As merely one example blocks 408 and 412 could be combined into a single block.

Figure 9:
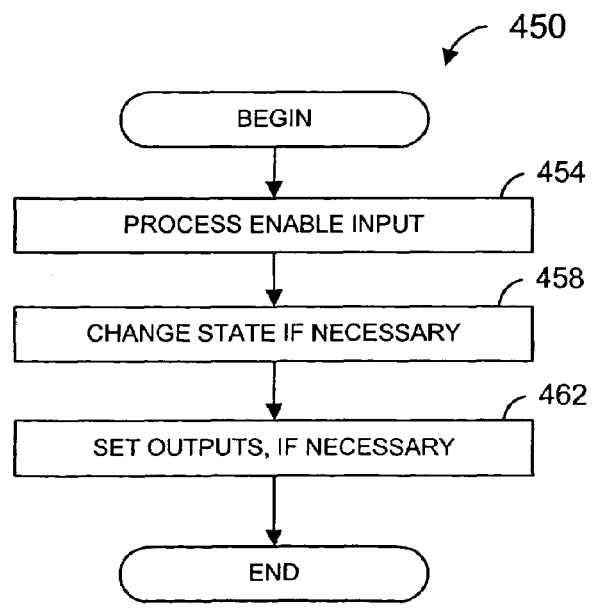
FIG. 9 is a flow diagram of another example method of operation of a state machine function block.

FIG. 9 is a flow diagram of a method of operation of the example SMFB 400. The method 450 of FIG. 9 may be implemented, for example, periodically and/or upon a triggering event. At a block 454, the ENABLE input of the SMFB 400 is processed. For example, it may be determined whether the ENABLE input is asserted and/or whether it has changed since it was previously processed.

At a block 458, a state of the SMFB 400 may be changed, if necessary. At a block 262, one or more data outputs of the SMFB 400 may be changed, if necessary. For example, it may be determined that one or more data outputs of the SMFB 400 should be changed because of a change in the state of the SMFB 400.

Figure 10:
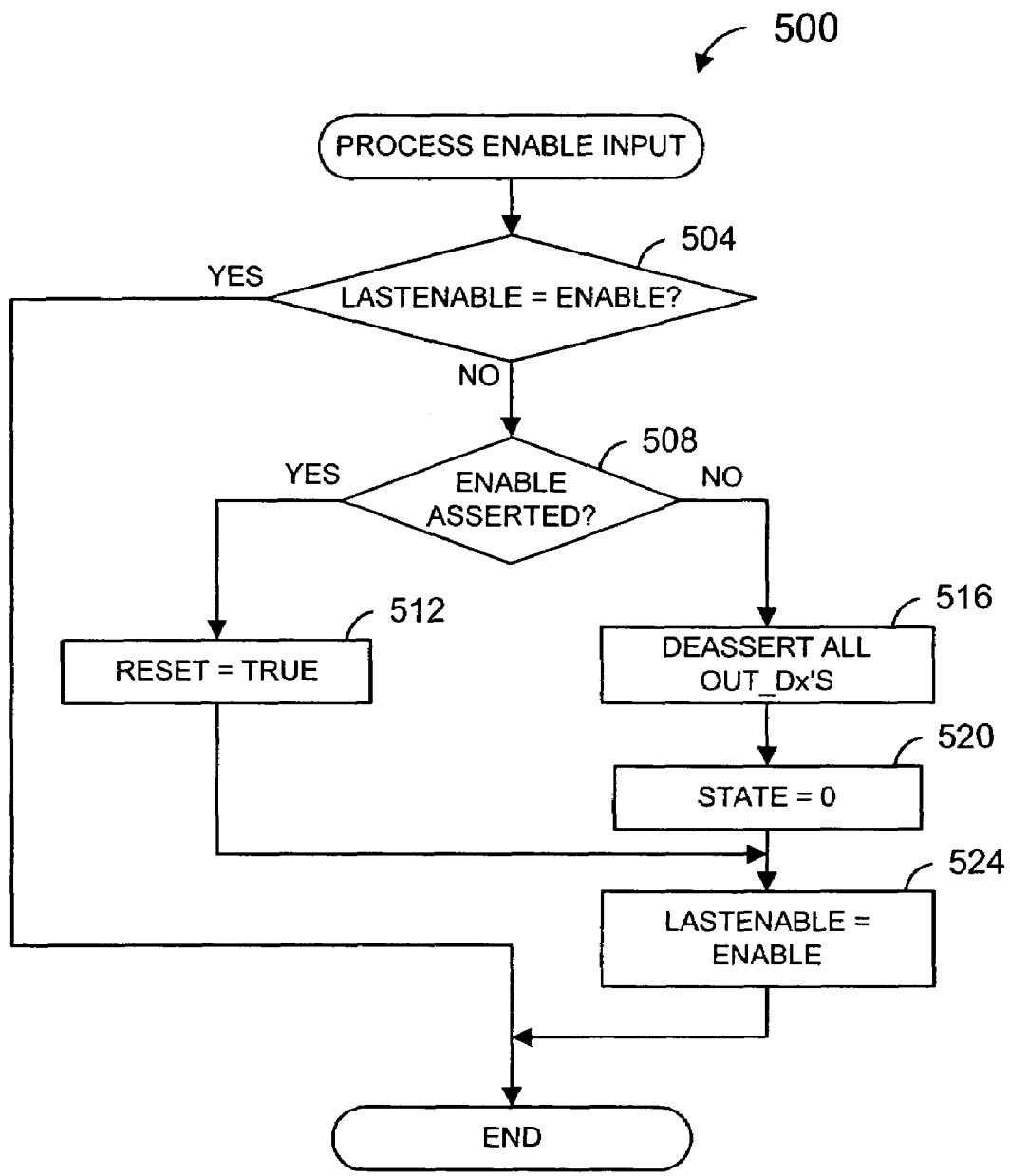
FIG. 10 is a flow diagram of an example routine for processing an enable input to a state machine function block.

Several example routines that may be used to implement the method 450, at least in part, will now be described. For instance, FIG. 10 is a flow diagram of an example routine 500 that may be used to process the ENABLE input to the SMFB. At a block 504, it may be determined whether a value of a variable LASTENABLE is the same as the value of the ENABLE input. The LASTENABLE variable is generally indicative of the value of the ENABLE at a previous time (for example, the value of the ENABLE variable during the previous running of the routine 500). If the values of LASTENABLE and ENABLE are the same, the routine 500 may end. Otherwise, the routine may proceed to a block 508 at which it may be determined if the ENABLE input is asserted. If the ENABLE input is asserted, then at a block 512 a variable RESET may be set to TRUE. If at the block 508 it is determined that the ENABLE input is not asserted, then at block 516, all of the outputs OUT_D1, OUT_D2, etc., are deasserted. Then, the routine may proceed to a block 520, at which a STATE variable is set to 0.

After the blocks 512 and 520, the routine may proceed to a block 524, at which the variable LASTENABLE is set to the value of the ENABLE input. After the block 524, the routine may end.

Figure 11:
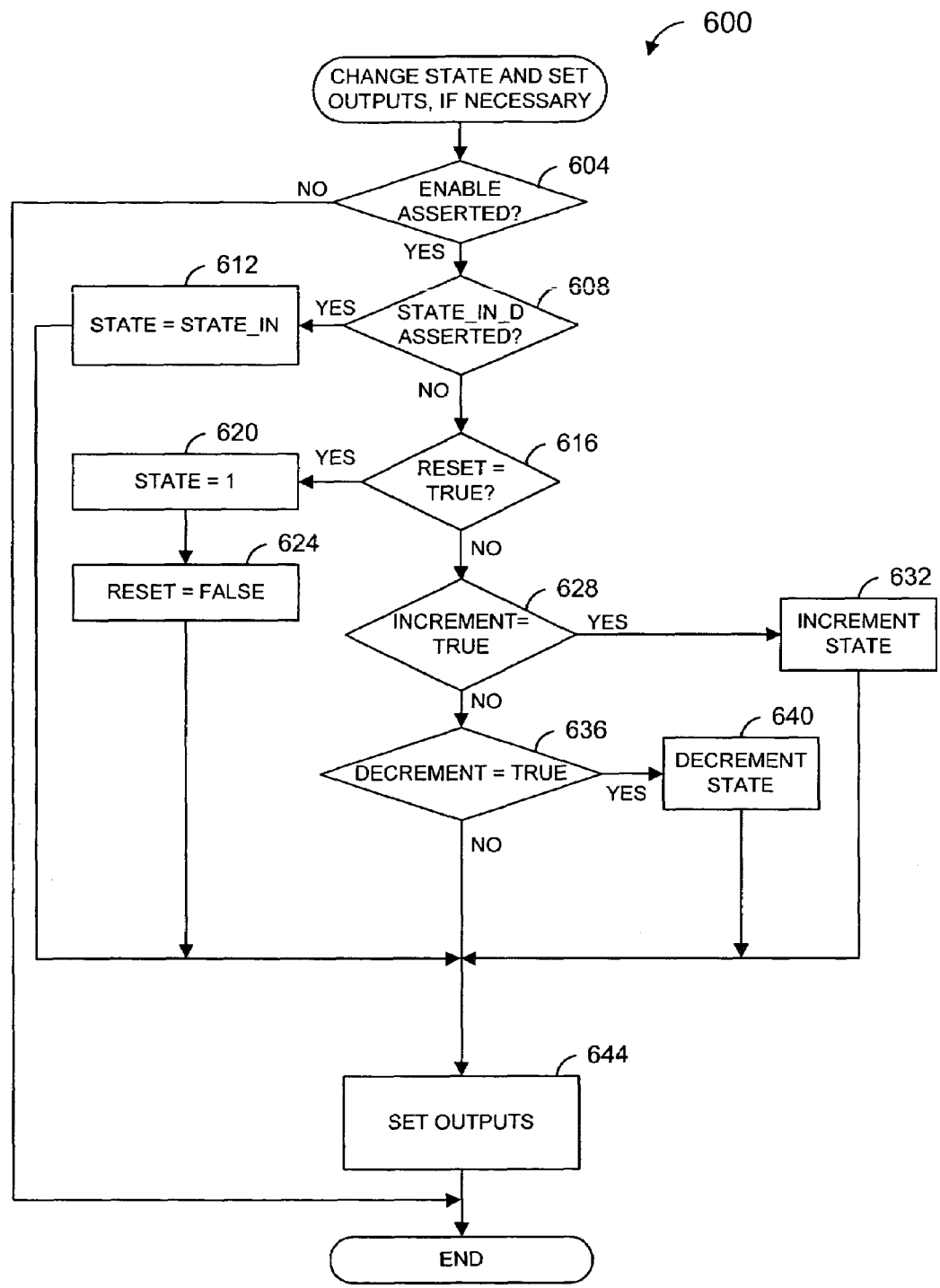
FIG. 11 is a flow diagram of an example routine for changing a state and setting outputs of a state machine function block.

FIG. 11 is a flow diagram of an example routine 600 that may be used to change the state of the SMFB and to set the outputs of the SMFB, if necessary. At a block 604, it may be determined if the ENABLE input is asserted. If it is not, the routine may end. If the ENABLE input is asserted, the routine may proceed to a block 608 at which it may be determined if the STATE_IN_D input is asserted. If it is asserted, the routine may proceed to a block 612 at which the STATE variable is set to the value of the STATE_IN input. If at the block 608 it is determined that the STATE_IN_D input is not asserted, the routine may proceed to the block 616.

At the block 616, it may be determined if the variable RESET is true. If it is true, the routine may proceed to the block 620 at which the variable STATE is set to one. Then, at a block 624, the RESET variable is set to FALSE. If at the block 616 it is determined that the variable RESET is not true, the routine may proceed to a block 628.

At the block 628, it may be determined if the INCREMENT input is asserted. If it is asserted, the routine may proceed to a block 632 at which the variable STATE is appropriately incremented. For example, the variable STATE may be appropriately incremented based on the value of the WRAP input as described previously. If at the block 628 it is determined that the INCREMENT input is not asserted, the routine may proceed to a block 636. At the block 636, the variable STATE may be appropriately decremented. For example, the variable STATE may be appropriately decremented based on the value of the WRAP input as described previously.

After blocks 612, 624, 632, and 640, and if at block 636 it is determined that the DECREMENT input is not asserted, the routine may proceed to a block 644. At the block 644, outputs of the SMFB may be set. An example of a routine 700 for implementing the block 644 is provided in FIG. 12. Then, the routine 600 may end.

Figure 12:
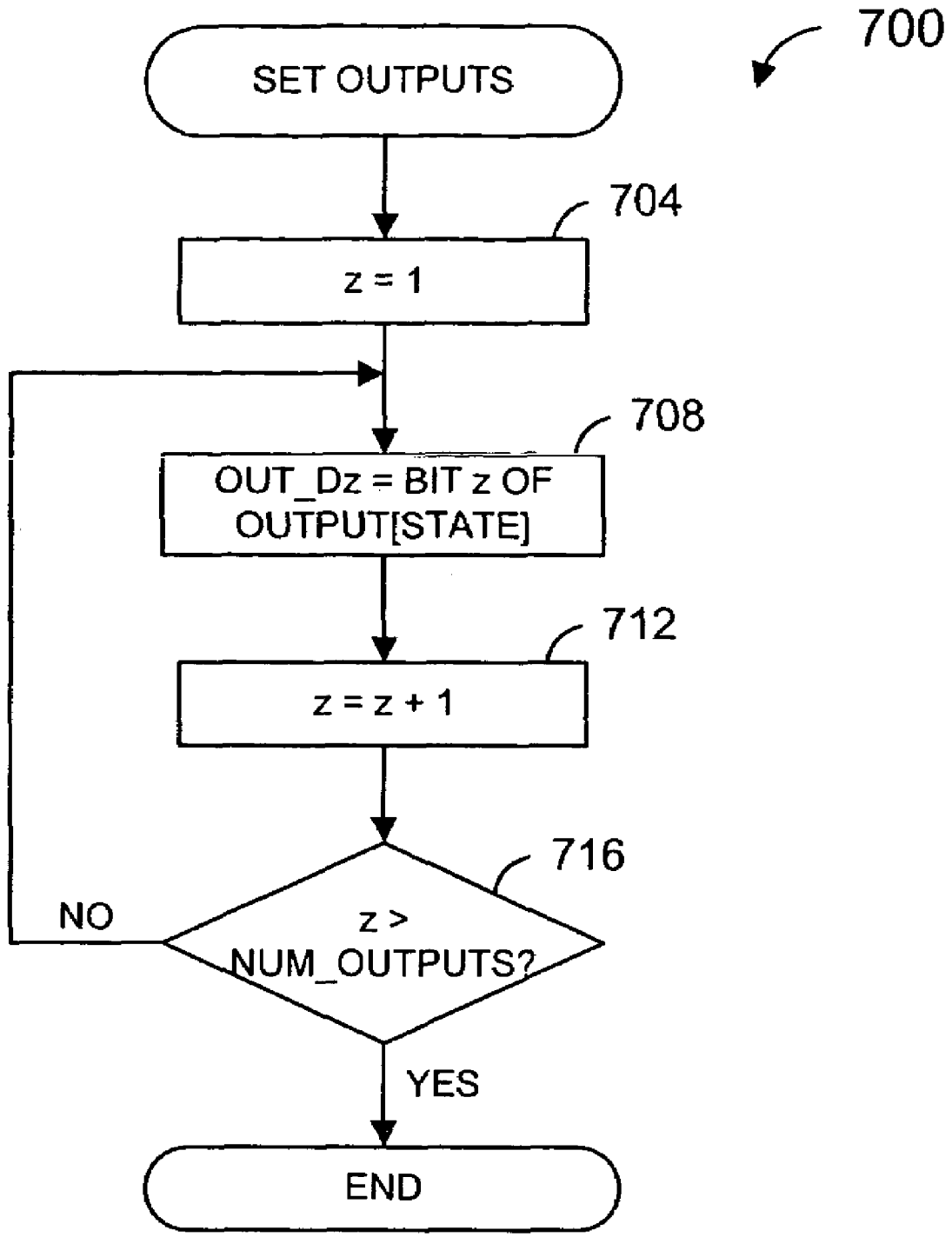
FIG. 12 is a flow diagram of an example routine for setting appropriate output values of a state machine function block.

FIG. 12 is a flow diagram of the example routine 700 that may be used to set outputs of the SMFB. At a block 704, a variable z is set to one. At a block 708, the output OUT_Dz (e.g., if z=1, OUT_Dz=OUT_D1) is set to the value of bit number z of an element of an array variable OUTPUT pointed to by the variable STATE. Each element of the OUTPUT array may be a variable that indicates, for a corresponding one of the states, the values of the outputs of the SMFB. In particular, the elements of the array may correspond to the states of the state machine. For example, OUTPUT[1] may correspond to state 1, OUTPUT[2] may correspond to state 2, etc. Additionally, each bit of each element may correspond to the outputs OUT_D1, OUT_D2, etc., of the SMFB. For instance, bits 1 through 5 may correspond to outputs OUT_D1 through OUT_D5, respectively. Referring to FIG. 6 for example, for the matrix 300 the OUTPUT array would have 7 elements, and the element OUTPUT[1] may be 0x10.

At a block 712, the variable z is incremented, and at a block 716 it may be determined if the value of z is greater than the number of outputs OUT_D1, OUT_D2, etc. If z is not greater than the number of outputs OUT_D1, OUT_D2, etc., the routine may proceed back to the block 708. Otherwise, the routine may end.

It is to be understood that the method 450 of FIG. 9 and the routines of FIGS. 10-12 are merely examples, and that in other examples, blocks may be modified, new blocks may be added, blocks may be reordered, blocks may be omitted, and/or blocks may be combined.

Figure 13:
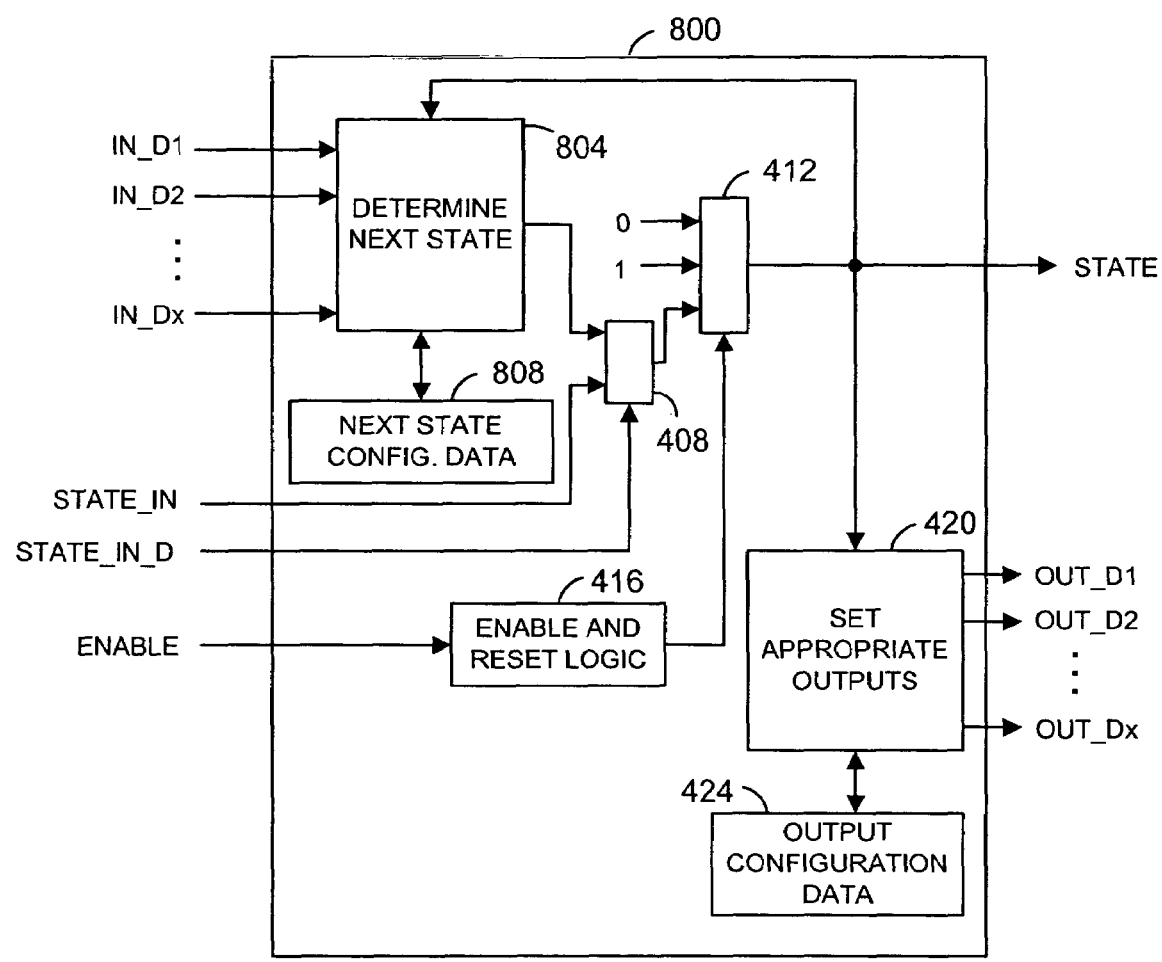
FIG. 13 is a block diagram of another example state machine function block.

Referring to FIGS. 4 and 8, other examples of SMFBs may have other types of inputs, in addition to, or as an alternative to, the INCREMENT and DECREMENT inputs. For instance, FIG. 13 is a block diagram of another example SMFB. The SMFB 800 includes inputs IN_D1, IN_D2, etc. These inputs may be used to determine if state change should occur, and, if so, to which state the state machine should transition. The SMFB 800 includes logic 804 that receives the inputs IN_D1, IN_D2, etc., and determines a next state of the state machine based, at least in part, on the inputs IN_D1, IN_D2, etc., and the current state of the state machine. In particular, the logic 804 accesses next state configuration data stored in a database 808. The database 808 may be stored on a computer readable medium as described above. The database 808 and the database 424 may be stored on the same computer readable medium, or different computer readable media. The next state configuration data may comprise configuration data that indicates, for each of at least some combinations of states and inputs, to which state the state machine should transition when the state machine is in the corresponding state and when the corresponding input is a particular value. The configuration data may be received by a graphical user interface that provides, for example, a state transition matrix or a state transition diagram. In these examples, a programmer can enter state transition data via the state transition matrix or the state transition diagram.

In general, an SMFB may be implemented by software, firmware, or hardware, or some combination of software, firmware, and/or hardware. Referring to FIG. 1, an SMFB may be implemented, for example, by one or more of the controllers 12a, 16a, I/O devices 24, logic solvers 50, and devices 22, 23, 60, 62. As another example, an SMFB may be implemented by one or more of the workstations 18a and 20a. For instance, the SMFB may be implemented by the workstation 18a and/or the workstation 20a as part of a simulation to test operation of the process plant or provide operator training. In some embodiments, the SMFB, may be implemented by a processor configured according to software, by a programmable logic device, e.g., a device including one or more of a gate array, a standard cell, a field programmable gate array (FPGA), a PROM, an EPROM, an EEPROM, a programmable array logic (PAL), a programmable logic array (PLA), etc.

Each of the blocks 404, 408, 412, 416, and 420 of FIG. 8 and the block 804 of FIG. 13 may be implemented by software, firmware, or hardware, or some combination of software, firmware, and/or hardware. Additionally, although the flow diagrams of FIGS. 10-12 were described as routines, these flow diagrams could be implemented by software, hardware, firmware, or a combination of software, firmware, and/or hardware.

Embodiments of a user interface, such as the user interfaces described above, may be implemented, in whole or in part, by a processor, for example, configured according to a software program. For instance, the workstation 18a or 20a, or some other computer, may implement, in whole or in part, the above-described user interface. A software program for implementing embodiments of a user interface may be embodied in software stored on a tangible medium such as a hard disk, a RAM, a battery backed-up RAM, a ROM, a CD-ROM, a PROM, an EPROM, an EEPROM, a DVD, a flash memory, etc., or a memory, such as a RAM, associated with the processor, but persons of ordinary skill in the art will readily appreciate that the entire program or parts thereof could alternatively be executed by a device other than a processor, and/or embodied in firmware and/or dedicated hardware in a well known manner.

While the invention is susceptible to various modifications and alternative constructions, certain illustrative embodiments thereof have been shown in the drawings and are described in detail herein. It should be understood, however, that there is no intention to limit the disclosure to the specific forms disclosed, but on the contrary, the intention is to cover all modifications, alternative constructions and equivalents falling within the spirit and scope of the disclosure as defined by the appended claims.

What is claimed is:

1. A method for configuring, via a computing device having a display device and an input device, a function block associated with a process plant, the function block to implement a state machine, the method comprising:
   providing a first graphical user interface via the display device to configure values of at least some outputs of a plurality of outputs of the function block for each of at least some states of a plurality of states of the state machine, wherein the first graphical user interface includes a plurality of graphical elements, wherein at least some graphical elements of the plurality of the graphical elements are associated with respective pairings of ones of the at least some states with ones of the at least some outputs;
   wherein the at least some outputs are to be used, at least in part, to effect one or more physical functions within the process plant;
   receiving output configuration data via the graphical user interface; and
   storing the output configuration data on a first computer readable medium associated with the function block.

2. A method according to claim 1, further comprising receiving data, via the graphical user interface, indicative of whether one or more, if any, of the at least some outputs should be forced to a particular value irrespective of a current state of the state machine.

3. A method according to claim 1, further comprising providing a second graphical user interface via the display device for specifying how the state machine is to transition among states of the plurality of states, wherein the graphical user interface includes a plurality of graphical elements, wherein at least some of the graphical elements can be used to specify that the state machine should transition between states based on at least one input to the function block;
   wherein the at least one input is to be associated with the process plant;
   receiving state transition data via the second graphical user interface; and
   storing the state transition data on a second computer readable medium associated with the function block.

4. A method according to claim 3, wherein the at least one input is to be received from at least one other function block associated with the process plant.

5. A method according to claim 3, wherein the at least one input is to be received from an operator interface.

6. A method according to claim 3, wherein the first computer readable medium comprises the second computer readable medium.

7. A method according to claim 3, further comprising receiving data, via the graphical user interface, indicative of how the state machine is to transition among the states of the plurality of states if one or more of the at least one input has a BAD status.

8. A method according to claim 3, wherein the plurality of outputs of the function block are to be provided to a process control system associated with the process plant.

9. A method according to claim 3, wherein the plurality of outputs of the function block are to be provided to a safety system associated with the process plant.

10. A method according to claim 1, wherein the plurality of graphical elements comprises a plurality of cells, wherein the cells of the plurality of cells are associated with respective pairings of ones of the at least some states with ones of the at least some outputs; and
wherein receiving the output configuration data comprises receiving output configuration data associated with at least some of the plurality of cells via the input device, wherein the output configuration data of each cell of the at least some of the plurality of cells is indicative of a desired value of the corresponding output when the state machine is in the corresponding state.

11. A method according to claim 10, further comprising displaying on the display device indications of the output configuration data in appropriate cells of the plurality of cells.

12. A method according to claim 10, wherein displaying on the display device the plurality of cells comprises displaying on the display device a matrix comprising the plurality of cells, the matrix comprising a plurality of rows of cells and a plurality of columns of cells, wherein each row of the plurality of rows is associated with a corresponding output of the at least some outputs, wherein each column of the plurality of columns is associated with a corresponding state of the at least some states.

13. A method according to claim 10, wherein displaying on the display device the plurality of cells comprises displaying on the display device a matrix comprising the plurality of cells, the matrix comprising a plurality of rows of cells and a plurality of columns of cells, wherein each row of the plurality of rows is associated with a corresponding state of the at least some states, wherein each column of the plurality of columns is associated with a corresponding output of the at least some outputs.

14. A method according to claim 10, further comprising:
receiving data, via the input device, indicative of a number of outputs in the plurality of outputs; and
determining a number of cells in the plurality of cells based on the number of outputs.

15. A method according to claim 14, further comprising:
receiving data, via the input device, indicative of a number of states in the plurality of states;
wherein determining the number of cells in the plurality of cells comprises determining the number of cells based on the number of outputs and the number of states.

16. A method according to claim 10, further comprising:
receiving data, via the input device, indicative of a number of states in the plurality of states; and
determining a number of cells in the plurality of cells based on the number of states.

17. A method according to claim 10, wherein displaying on the display device the plurality of cells comprises displaying on the display device a matrix comprising the plurality of cells, the matrix comprising a plurality of rows of cells and a plurality of columns of cells, wherein one of each row of the plurality of rows or each column of the plurality of columns is associated with a corresponding output of the at least some outputs, wherein the other one of each row of the plurality of rows or each column of the plurality of columns is associated with a corresponding state of the at least some states.

18. A tangible medium storing machine readable instructions comprising:
first code to provide a first graphical user interface via a display device of a computing device to configure values of at least some outputs of a plurality of outputs of a function block associated with a process plant for each of at least some states of a plurality of states of a state machine to be implemented by the function block;
wherein the at least some outputs are to be used, at least in part, to effect one or more physical functions within the process plant;
second code to receive output configuration data via the graphical user interface; and
third code to store the output configuration data on a first computer readable medium associated with the function block.

19. A tangible medium according to claim 18, wherein the first code comprises fourth code to display on the display device a plurality of cells associated with the function block, wherein each cell of the plurality of cells corresponds to a respective one of the at least some outputs and a respective one of the at least some states of the plurality of states of the state machine; and
wherein the second code comprises fifth code to receive output configuration data associated with at least some of the plurality of cells via an input device of the computing device, wherein the output configuration data of each cell of the at least some of the plurality of cells is indicative of a desired value of the corresponding output when the state machine is in the corresponding state.

20. A tangible medium according to claim 19, further comprising sixth code to display on the display device indications of the output configuration data in appropriate cells of the plurality of cells.

21. A tangible medium according to claim 19, wherein the fourth code comprises sixth code to display on the display device a matrix comprising the plurality of cells, the matrix comprising a plurality of rows of cells and a plurality of columns of cells, wherein each row of the plurality of rows is associated with a corresponding output of the at least some outputs, wherein each column of the plurality of columns is associated with a corresponding state of the at least some states.

22. A tangible medium according to claim 19, wherein the fourth code comprises sixth code to display on the display device a matrix comprising the plurality of cells, the matrix comprising a plurality of rows of cells and a plurality of columns of cells, wherein each row of the plurality of rows is associated with a corresponding state of the at least some states, wherein each column of the plurality of columns is associated with a corresponding output of the at least some outputs.

23. A tangible medium according to claim 19, further comprising:
sixth code to receive data, via the input device, indicative of a number of outputs in the plurality of outputs; and
seventh code to determine a number of cells in the plurality of cells based on the number of outputs.

24. A tangible medium according to claim 23, further comprising:
eighth code to receive data, via the input device, indicative of a number of states in the plurality of states;
wherein the seventh code comprises ninth code to determine the number of cells based on the number of outputs and the number of states.

25. A tangible medium according to claim 19, further comprising:
sixth code to receive data, via the input device, indicative of a number of states in the plurality of states; and
sixth code to determine a number of cells in the plurality of cells based on the number of states.

26. A tangible medium according to claim 19, wherein the fourth code comprises sixth code to display on the display device a matrix comprising the plurality of cells, the matrix comprising a plurality of rows of cells and a plurality of columns of cells, wherein one of each row of the plurality of rows or each column of the plurality of columns is associated with a corresponding output of the at least some outputs, wherein the other one of each row of the plurality of rows or each column of the plurality of columns is associated with a corresponding state of the at least some states.

27. A tangible medium according to claim 18, further comprising fourth code to receive data, via the graphical user interface, indicative of whether one or more, if any, of the at least some outputs should be forced to a particular value irrespective of a current state of the state machine.

28. A tangible medium according to claim 18, further comprising fourth code to provide a second graphical user interface via the display device for specifying how the state machine is to transition among states of the plurality of states, wherein the graphical user interface includes a plurality of graphical elements, wherein at least some of the graphical elements can be used to specify that the state machine should transition between states based on at least one input to the function block;
wherein the at least one input is to be associated with the process plant;
fifth code to receive state transition data via the second graphical user interface; and
sixth code to store the state transition data on a second computer readable medium associated with the function block.

29. A tangible medium according to claim 28, wherein the at least one input is to be received from at least one other function block associated with the process plant.

30. A tangible medium according to claim 28, wherein the at least one input is to be received from an operator interface.

31. A tangible medium according to claim 28, wherein the first computer readable medium comprises the second computer readable medium.

32. A tangible medium according to claim 28, further comprising seventh code to receive data, via the graphical user interface, indicative of how the state machine is to transition among the states of the plurality of states if one or more of the at least one input has a BAD status.

33. A tangible medium according to claim 28, wherein the plurality of outputs of the function block are to be provided to a process control system associated with the process plant.

34. A tangible medium according to claim 28, wherein the plurality of outputs of the function block are to be provided to a safety system associated with the process plant.

35. A method of implementing a function block for use in controlling one or more field devices in a process plant, the method comprising:
providing a graphical user interface via a display of a computing device to configure values of at least some outputs of a plurality of outputs of the function block for each of at least some states of a plurality of states of a state machine to be implemented by the function block;
wherein the at least some outputs are to be used, at least in part, to effect one or more physical functions within the process plant;
receiving output configuration data via the graphical user interface;
storing the output configuration data on a first computer readable medium associated with the function block;
receiving at least one input associated with the process plant;
changing a current state of the state machine, if necessary, based, at least in part, on the at least one input;
retrieving, based on at least the current state, output configuration data associated with the current state from the first computer readable medium; and
setting the at least some outputs based, at least in part, on the retrieved output configuration data.

36. A method according to claim 35, wherein the at least one input is to be received from at least one other function block associated with the process plant.

37. A method according to claim 35, wherein the at least one input is to be received from an operator interface.

38. A method according to claim 35, wherein the output configuration data includes data indicative of whether one or more of the at least some outputs should be set to a particular value irrespective of the current state of the state machine;
wherein setting the at least some outputs is further based, at least in part, on the data indicative of whether the one or more of the at least some outputs should be set to the particular value.

39. A method according to claim 35, wherein the at least one input comprises an increment input and a decrement output;
wherein changing the current state of the state machine comprises incrementing the current state if the increment input indicates that the current state should be incremented; and
wherein changing the current state of the state machine further comprises decrementing the current state if the decrement input indicates that the current state should be incremented.

40. A method according to claim 39, wherein the at least one input further comprises an input indicative of whether, if the current state is a highest enabled state, incrementing the current state should comprise setting the current state to a lowest enabled state; and
wherein the at least one input further comprises an input indicative of whether, if the current state is the lowest enabled state, decrementing the current state should comprise setting the current state to the highest enabled state.

41. A method according to claim 40, wherein the input indicative of whether, if the current state is the highest enabled state, incrementing the current state should comprise setting the current state to the lowest enabled state, and the input indicative of whether, if the current state is the lowest enabled state, decrementing the current state should comprise setting the current state to the highest enabled state, comprise a single input.

42. A method according to claim 35, further comprising:
receiving an input indicative of whether the function block is to be disabled; and
if the input indicative of whether the function block is to be disabled indicates that the function block is to be disabled, setting the current state of the state machine to a disabled state.

43. A method according to claim 42, further comprising:
receiving an input indicative of whether the state machine is to set to an initial state; and
if the input indicative of whether the state machine is to be set to the initial state indicates that the state machine should be set to the initial state, setting the current state of the state machine to the initial state;
wherein the input indicative of whether the state machine function block is to be enabled and the input indicative of whether the state machine function block is to be set to the initial state comprise a single input.

44. A method according to claim 35, further comprising:
receiving an input indicative of whether the state machine is to be set to an initial state; and
if the input indicative of whether the state machine is to be set to the initial state indicates that the state machine should be set to the initial state, setting the current state of the state machine to the initial state.

45. A method according to claim 35, further comprising:
receiving an input indicative of whether the state machine function block is to be set to a desired state;
receiving an input indicative of the desired state; and
if the input indicative of whether the state machine function block is to be set to the desired state indicates that the state machine function block should be set to the desired state, setting the current state of the state machine to the desired state.

46. A method according to claim 35, further comprising providing at least one output of the plurality of outputs that is indicative of the current state of the state machine.

47. A method according to claim 35, wherein the plurality of outputs of the function block are to be provided to a process control system associated with the process plant.

48. A method according to claim 35, wherein the plurality of outputs of the function block are to be provided to a safety system associated with the process plant.

49. A function block entity for use in a process plant having a processor adapted to control one or more field devices, the function block entity comprising:
a user modifiable state machine configuration database including output configuration data indicative of values of at least some outputs of a plurality of outputs of the function block for each of at least some states of a plurality of states of a state machine to be implemented by the function block;
wherein the at least some outputs are to be used, at least in part, to effect one or more physical functions within the process plant;
a first computer readable medium;
first code stored on the first computer readable medium to receive at least one input associated with the process plant;
second code stored on the first computer readable medium to change a current state of the state machine, if necessary, based, at least in part, on the at least one input, wherein the second code is fixed;
third code stored on the first computer readable medium to retrieve, based on at least the current state, output configuration data associated with the current state from the configuration database; and
fourth code stored on the first computer readable medium to set the at least some outputs based, at least in part, on the retrieved output configuration data.

50. A function block entity according to claim 49, wherein the at least one input is to be received from at least one other function block associated with the process plant.

51. A function block entity according to claim 49, wherein the at least one input is to be received from an operator interface.

52. A function block entity according to claim 49, wherein the state machine configuration database is stored on the first computer readable medium.

53. A function block entity according to claim 49, wherein the state machine configuration database is stored on a second computer readable medium different from the first computer readable medium.

54. A function block entity according to claim 49, wherein the configuration database includes data indicative of whether one or more of the at least some outputs should be set to a particular value irrespective of the current state of the state machine;
wherein the fourth code comprises fifth code stored on the first computer readable medium includes fifth code stored on the first computer readable medium to set the at least some of the outputs further based, at least in part, on the data indicative of whether the one or more of the at least some outputs should be set to the particular value irrespective of the current state of the state machine.

55. A function block entity according to claim 49, wherein the at least one input comprises an increment input and a decrement input;
wherein the second code comprises fifth code stored on the first computer readable medium to increment the current state if the increment input indicates that the current state of the state machine should be incremented;
wherein the second code further comprises sixth code stored on the first computer readable medium to decrement the current state if the decrement input indicates that the current state of the state machine should be decremented.

56. A function block entity according to claim 55, wherein the at least one input further comprises an input indicative of whether, if the current state is a highest enabled state, incrementing the current state should comprise setting the current state to a lowest enabled state; and
wherein the at least one input further comprises an input indicative of whether, if the current state is the lowest enabled state, decrementing the current state should comprise setting the current state to the highest enabled state.

57. A function block entity according to claim 56, wherein the input indicative of whether, if the current state is a highest enabled state, incrementing the current state should comprise setting the current state to the lowest enabled state, and the input indicative of whether, if the current state is the lowest enabled state, decrementing the current state should comprise setting the current state to the highest enabled state, comprise a single input.

58. A function block entity according to claim 49, wherein the at least one input comprises an input indicative of whether the function block is to be disabled, the function block entity further comprising:

fifth code stored on the first computer readable medium to set the current state of the state machine to a disabled state if the input indicative of whether the function block is to be disabled indicates that the function block is to be disabled.

59. A function block entity according to claim 58, wherein the at least one input comprises an input indicative of whether the state machine is to be set to an initial state, the function block entity further comprising:

sixth code stored on the first computer readable medium to set the current state of the state machine to the initial state if the input indicative of whether the state machine is to be set to the initial state indicates that the state machine is to be set to the initial state;

wherein the input indicative of whether the function block is to be disabled and the input indicative of whether the state machine is to be set to the initial state comprise a single input.

60. A function block entity according to claim 49, wherein the at least one input comprises an input indicative of whether the state machine is to be set to an initial state, the function block entity further comprising:

fifth code stored on the first computer readable medium to set the current state of the state machine to the initial state if the input indicative of whether the state machine is to be set to the initial state indicates that the state machine is to be set to the initial state.

61. A function block entity according to claim 49, wherein the at least one input comprises an input indicative of whether the state machine is to be set to a desire state, and an input indicative of the desired state, the function block entity further comprising:

fifth code stored on the first computer readable medium to set the current state of the state machine to the desired state if the input indicative of whether the state machine is to be set to the desire state indicates that the state machine is to be set to the desire state.

62. A function block entity according to claim 49, further comprising fifth code stored on the first computer readable medium to provide at least one output indicative of the current state of the state machine.

63. A function block entity according to claim 49, wherein the plurality of outputs of the function block are to be provided to a process control system associated with the process plant.

64. A function block entity according to claim 49, wherein the plurality of outputs of the function block are to be provided to a safety system associated with the process plant.

65. A method of implementing a function block for use in simulating control of one or more field devices in a process plant, the method comprising:

providing a graphical user interface via a display of a computing device to configure values of at least some outputs of a plurality of outputs of the function block for each of at least some states of a plurality of states of a state machine to be implemented by the function block;

wherein the at least some outputs are to be used, at least in part, to simulate operation of at least one of a process control system and a safety system associated with the process plant;

receiving output configuration data via the graphical user interface;

storing the output configuration data on a first computer readable medium associated with the function block;

receiving at least one input associated with the process plant;

changing a current state of the state machine, if necessary, based, at least in part, on the at least one input;

retrieving, based on at least the current state, output configuration data associated with the current state from the first computer readable medium; and setting the at least some outputs based, at least in part, on the retrieved output configuration data.

* * * * *